US012562545B2

(12) United States Patent
McCahon et al.

(10) Patent No.: US 12,562,545 B2
(45) Date of Patent: Feb. 24, 2026

(54) TUNABLE HIGH FREQUENCY MODULATED LIGHT BEAM

(71) Applicant: APPLIED ENERGETICS, INC., Tucson, AZ (US)

(72) Inventors: Stephen William McCahon, Tucson, AZ (US); Alan Kost, Tucson, AZ (US)

(73) Assignee: Applied Energetics, Inc., Tucson, AZ (US)

( * ) Notice: Subject to any disclaimer, the term of this patent is extended or adjusted under 35 U.S.C. 154(b) by 470 days.

(21) Appl. No.: 18/169,301

(22) Filed: Feb. 15, 2023

(65) Prior Publication Data

US 2023/0283037 A1 Sep. 7, 2023

Related U.S. Application Data

(60) Provisional application No. 63/268,039, filed on Feb. 15, 2022.

(51) Int. Cl.
H01S 3/1106 (2023.01)
H01S 3/00 (2006.01)
H01S 3/067 (2006.01)
H01S 3/30 (2006.01)

(52) U.S. Cl.
CPC .......... H01S 3/1106 (2013.01); H01S 3/0057 (2013.01); H01S 3/06725 (2013.01); H01S 3/30 (2013.01)

(58) Field of Classification Search
CPC .. H01S 3/1106; H01S 3/0057; H01S 3/06725; H01S 3/30; H01S 3/005; H01S 3/0085; G02F 2203/26
See application file for complete search history.

(56) References Cited

U.S. PATENT DOCUMENTS

| | | | | |
|---|---|---|---|---|
| 5,822,100 A | * | 10/1998 | Robinson | H04B 10/2569 398/152 |
| 2006/0192969 A1 | * | 8/2006 | Marks | G01N 21/65 356/451 |
| 2012/0230353 A1 | * | 9/2012 | Xu | H01S 3/10061 372/18 |
| 2013/0163623 A1 | * | 6/2013 | Huang | H01S 3/0057 372/25 |

FOREIGN PATENT DOCUMENTS

EP 3905457 A1 * 11/2021 ........... H01S 3/2316

* cited by examiner

*Primary Examiner* — Xinning(Tom) Niu
(74) *Attorney, Agent, or Firm* — Martensen IP; Michael C. Martensen

(57) ABSTRACT

A tunable, modulated high-frequency light beam from a single source of coherent light. An ultra-short pulse of coherent light, having an optical spectrum, is derived from a single source. Spreading the optical spectrum of the ultra-short pulse of coherent light forms a spectrally spread optical pulse which is thereafter split into two or more spectrally spread optical pulses. At least one of the two or more spectrally spread optical pulses is delayed, such that, upon recombining the two or more spectrally spread optical pulses a tunable, modulated spectrally spread optical pulse is formed.

22 Claims, 8 Drawing Sheets

210

215

220

230

215

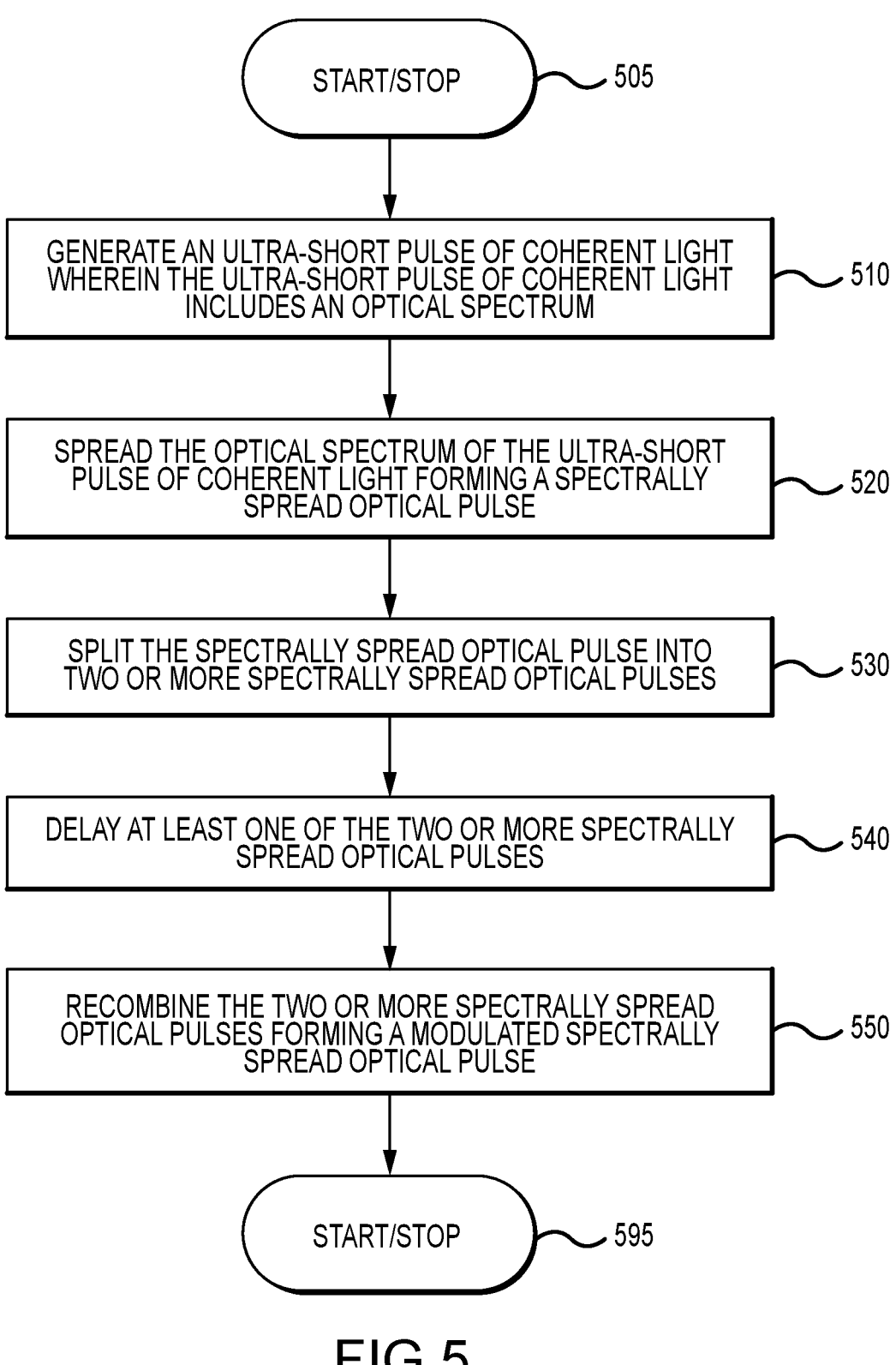

START/STOP — 505

GENERATE AN ULTRA-SHORT PULSE OF COHERENT LIGHT WHEREIN THE ULTRA-SHORT PULSE OF COHERENT LIGHT INCLUDES AN OPTICAL SPECTRUM — 510

SPREAD THE OPTICAL SPECTRUM OF THE ULTRA-SHORT PULSE OF COHERENT LIGHT FORMING A SPECTRALLY SPREAD OPTICAL PULSE — 520

SPLIT THE SPECTRALLY SPREAD OPTICAL PULSE INTO TWO OR MORE SPECTRALLY SPREAD OPTICAL PULSES — 530

DELAY AT LEAST ONE OF THE TWO OR MORE SPECTRALLY SPREAD OPTICAL PULSES — 540

RECOMBINE THE TWO OR MORE SPECTRALLY SPREAD OPTICAL PULSES FORMING A MODULATED SPECTRALLY SPREAD OPTICAL PULSE — 550

START/STOP — 595

FIG.5

TUNABLE HIGH FREQUENCY MODULATED LIGHT BEAM

RELATED APPLICATION

The present application relates to and claims the benefit of priority to U.S. Provisional Patent Application No. 63/268, 039 filed Feb. 15, 2022 which is hereby incorporated by reference in its entirety for all purposes as if fully set forth herein.

BACKGROUND OF THE INVENTION

Field of the Invention

Embodiments of the present invention relate, in general, to light modulation and more particularly to tunable high frequency modulation of a light beam.

Relevant Background

Light behaves as a wave and as a particle, depending on the circumstances and the effect being observed. This concept is now known as wave-particle duality. From one point of view, light is a type of electromagnetic wave due to the behavior of extremely small particles called photons. Each photon, also called light quantum, contains a minute energy packet of electromagnetic radiation.

Electromagnetic waves are invisible forms of energy that travel though the universe. Despite being invisible, the results of this energy can be very apparent. The light that our eyes can see represents a small part of the electromagnetic spectrum. This visible part of the electromagnetic spectrum consists of the colors that we see in a rainbow—from reds and oranges, through blues and purples. Each of these colors corresponds to a different wavelength of light. FIG. 1 is a representation of the visible light spectrum 110 illustrating how various colors contained within light are associated with different wavelengths. White light 110, when directed through a prism or similar device spreads out the wavelengths of light so that each color, each a different wavelength, can be observed. The wavelengths of visible light range from violet 160 having a wavelength around 400-420 nanometers to red 120, the longest wavelength of visible light, at 620-780 nanometers. Residing between violet 160 and red 120 exists all the other colors of the rainbow including indigo 130, blue 140, green 145, yellow 150, and orange 155.

Waves, including electromagnetic waves, can interfere with each other resulting in yet a new wave or a wave with unique characteristics. In a simplistic example consider waves created by two passing boats in an otherwise calm lake. As the waves interact a new pattern of crests and troughs are created. In one instance, the amplitude of resulting wave is increased while in others they interact to cancel themselves out. Another example of wave interference occurs with sound waves.

Beats are the periodic and repeating fluctuations heard in the intensity of a sound when two sound waves of similar frequencies interfere with one another. A beat pattern is characterized by a wave whose amplitude is changing at a regular rate. Consider an orchestra preparing for a concert. After warming up one player plays a single note. Others in the orchestra play their instrument to match that tone. Each plays the same note on their instrument and listens for these periodic and repeating fluctuations in tone, e.g., beats. The slower the beat, the closer their instrument is to that of their peers. By eliminating the beats, they have tuned their instrument.

As with water and sound waves, an important characteristic of light waves is their ability, under certain circumstances, to interfere with one another. The definition of interference in physics, and as used herein, is the superposition of waves, causing an increase or decrease in the amplitude of the resulting wave. Most people observe some type of optical interference every day, but do not realize what is occurring to produce this phenomenon. One of the best examples of the interference of light is demonstrated by the light reflected from a film of oil floating on water or a soap bubble that reflects a variety of beautiful colors when illuminated by natural or artificial light sources.

This dynamic interplay of colors derives from the simultaneous reflection of light from both the inside and outside surfaces. The two surfaces are very close together (the bubble is only a few microns thick), and light reflected from the inner surface interferes both constructively and destructively with light reflected from the outer surface. This is because light reflected from the inner surface of the bubble must travel further than light reflected from the outer surface. When the light waves reflected from the inner and outer surface combine, they will interfere with each other, removing or reinforcing some parts of white light by destructive or constructive interference. This results in the visible variations in color reflected from the bubble. If the extra distance traveled by the inner light waves is exactly the wavelength of the outer light waves, then they will recombine constructively, and bright colors of those wavelengths will be produced. In places where the waves are out of step, destructive interference will occur, canceling the reflected light (and the color).

To better understand this phenomenon, consider FIGS. 2A-E. FIGS. 2A-E show the constitutive and destructive effects of wave interference. Each wave in the example shown in FIG. 2A includes changes to the wave's frequency or wavelength. The amplitude of each wave 210, 220, in this example, is constant as compared to a central axis 215 with each wave varying in frequency. One should recognize that in other examples the amplitude may vary, or both the amplitude and frequency of a wave may modulate. For this example, the waves vary±from a central axis 215 of zero amplitude.

When the waves overlap, interfere, both constructive and destructive interference occurs. When both waves are positive, they are both 210, 220 above the central axis 215, the amplitude of the waves are combined as shown in FIG. 2B resulting in a new amplitude 230. With reference to FIG. 2C, when one wave 210 is positive and the other negative 220, the interference is destructive 240. The interference (overlap) of two waves 210, 220, upon being combined as illustrated in FIGS. 2D and 2E, produces a unique third wave 280 that varies in both frequency and amplitude. Waves generated from such interference have many uses.

Holograms, for example, depend upon the interference of light to produce their three-dimensional-like images. Both a reference and object-illuminating beam are reflected onto a thick film from opposite sides. The resultant beams interfere to produce light and dark areas that correspond to an image that appears three-dimensional.

While the use of interfering light waves is highly desired, the generation is not trivial. In most instances separate sources of light are generated and then combined to cause the interference. As each source of light is fixed the interference is static. To modify the interference one or more of the sources of light must be altered. What is needed is the ability to form a tunable high frequency modulated light beam from a single static source of light. These and other deficiencies of the prior art are addressed by one or more of the embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

A tunable, modulated high-frequency light beam is formed from a single source of coherent light. In one embodiment of the present invention a method for light modulation begins with generation of an ultra-short pulse of coherent light. The ultra-short pulse of coherent light, having an optical spectrum, is derived from a single source. The methodology continues by spreading the optical spectrum of the ultra-short pulse of coherent light forming a spectrally spread optical pulse which is thereafter split into two or more spectrally spread optical pulses. At least one of the two or more spectrally spread optical pulses is delayed, such that, upon recombining the two or more spectrally spread optical pulses a tunable, modulated spectrally spread optical pulse is formed.

In other embodiments of the present invention, the spreading of the optical spectrum of the ultra-short pulse of coherent light is accomplished within a dispersion compensating fiber. Another aspect of the invention directs each of the two or more spectrally spread optical pulses to follow a unique optical path wherein each optical path has a distinct path length, and, by modulating the path length of at least one unique optical path at least one of the two or more spectrally spread optical pulses is delayed. The delaying, in one embodiment of the present invention, is controlled by an optical delay module. The resulting modulating delay can form a light beam having a modulated Radio Frequency. Alternatively, the modulated spectrally spread optical pulse of the present invention can form a tunable beat frequency wherein the tunable beat frequency matches a molecular resonance frequency. In another version of the present invention, the tunable beat frequency matches a select resonance frequency. For example, the tunable beat frequency can be generated to excite one or more Raman modes of amplification. In yet another version of the present invention, the delaying step in the method for light modulation includes forming at least one delayed spectrally spread optical pulse and a non-delayed spectrally spread optical pulse. Recombining the at least one delayed spectrally spread optical pulse with the non-delayed spectrally spread optical pulse forms the modulated spectrally spread optical pulse wherein the modulated spectrally spread optical pulse includes beat frequency. And in another version of the present invention delaying includes modulating a delay of the at least one of the two or more spectrally spread optical pulses thereby tuning the modulated spectrally spread optical pulse.

A system for light modulation includes, in one embodiment, an ultra-short pulse of coherent light, having an optical spectrum, coupled to a dispersion module, such as a dispersion compensating fiber, configured to spread the optical spectrum of the ultra-short pulse of coherent light forming a spectrally spread optical pulse. An optical splitter is coupled to the output of the dispersion module and configured to split the spectrally spread optical pulse into two or more spectrally spread optical pulses A variable optical delay module is configured to accept at least one of the two or more spectrally spread optical pulses and delay its transmission. An optical combiner recombines the two or more spectrally spread optical pulses forming a modulated spectrally spread optical pulse. The system for light modulation of the present invention further includes, in another embodiment, a light source that is configured to generate thane ultra-short pulse of coherent light. In one version of the invention the light source is a mode-locked laser and is a single light source.

The variable optical delay of the present invention includes, in one version, two or more optical paths and wherein each path has a distinct path length. The recombination of beams that follow these two or more optical paths forms the modulated spectrally spread optical pulse which, in one embodiment, is a tunable beat frequency In one version of the present invention the tunable beat frequency is a modulated Radio Frequency which, in another version, is a select resonance frequency including a molecular resonance frequency. In another version of the invention the tunable beat frequency is configured to excite one or more Raman modes of amplification.

The features and advantages described hereafter in this disclosure and detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein:

FIG. 5 presents a method flow chart for producing the tunable, modulated high-frequency light beam of the present invention.

Figure 1:
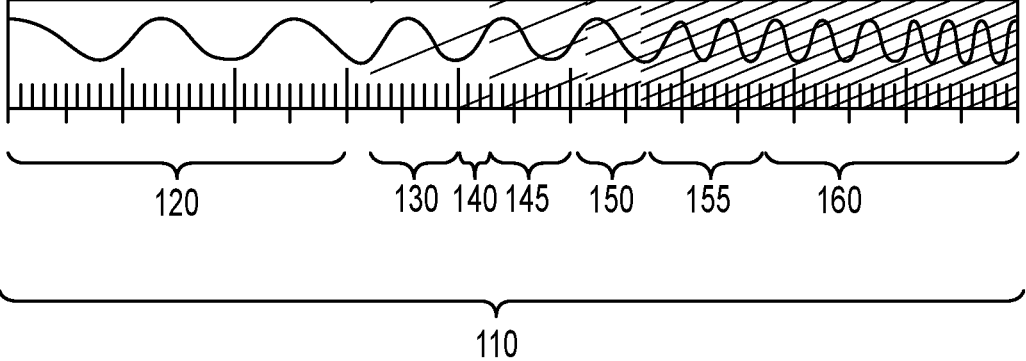
FIG. 1 shows the visible light frequency spectrum.
Figure 2A:
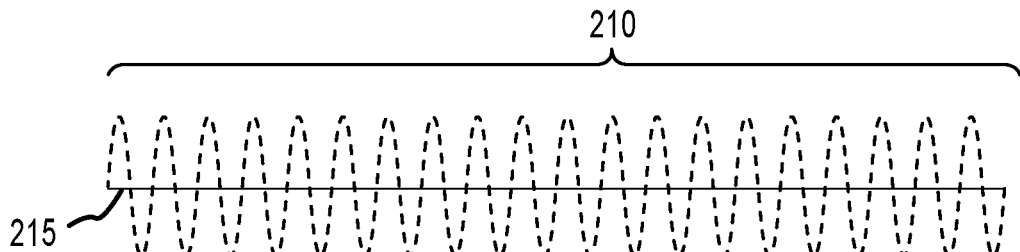
FIGS. 2A-2F show various stages of constructive and destructive wave interference.
Figure 2A:
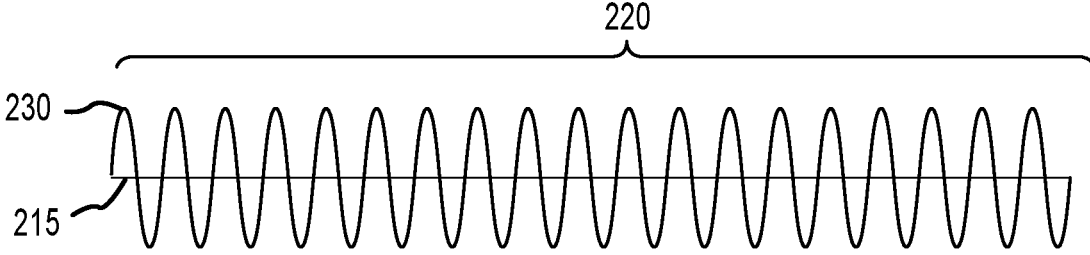
Figure 2C:
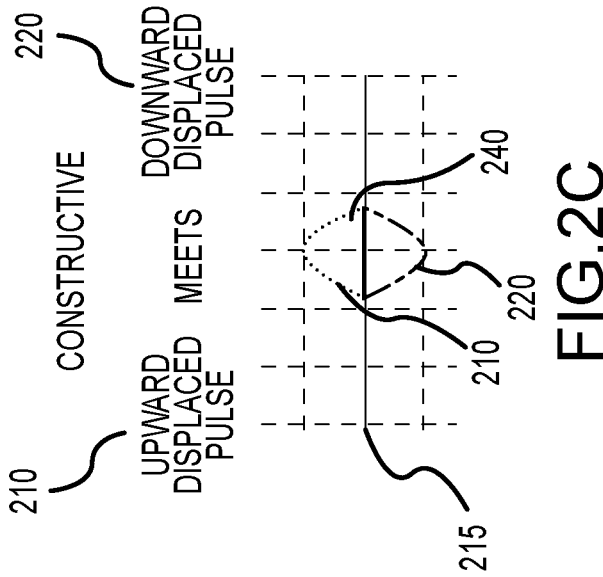
Figure 2B:
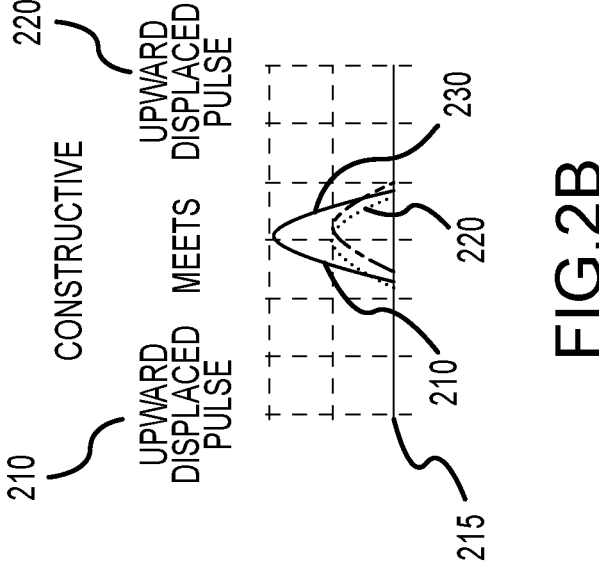
Figures 2D, 2E:
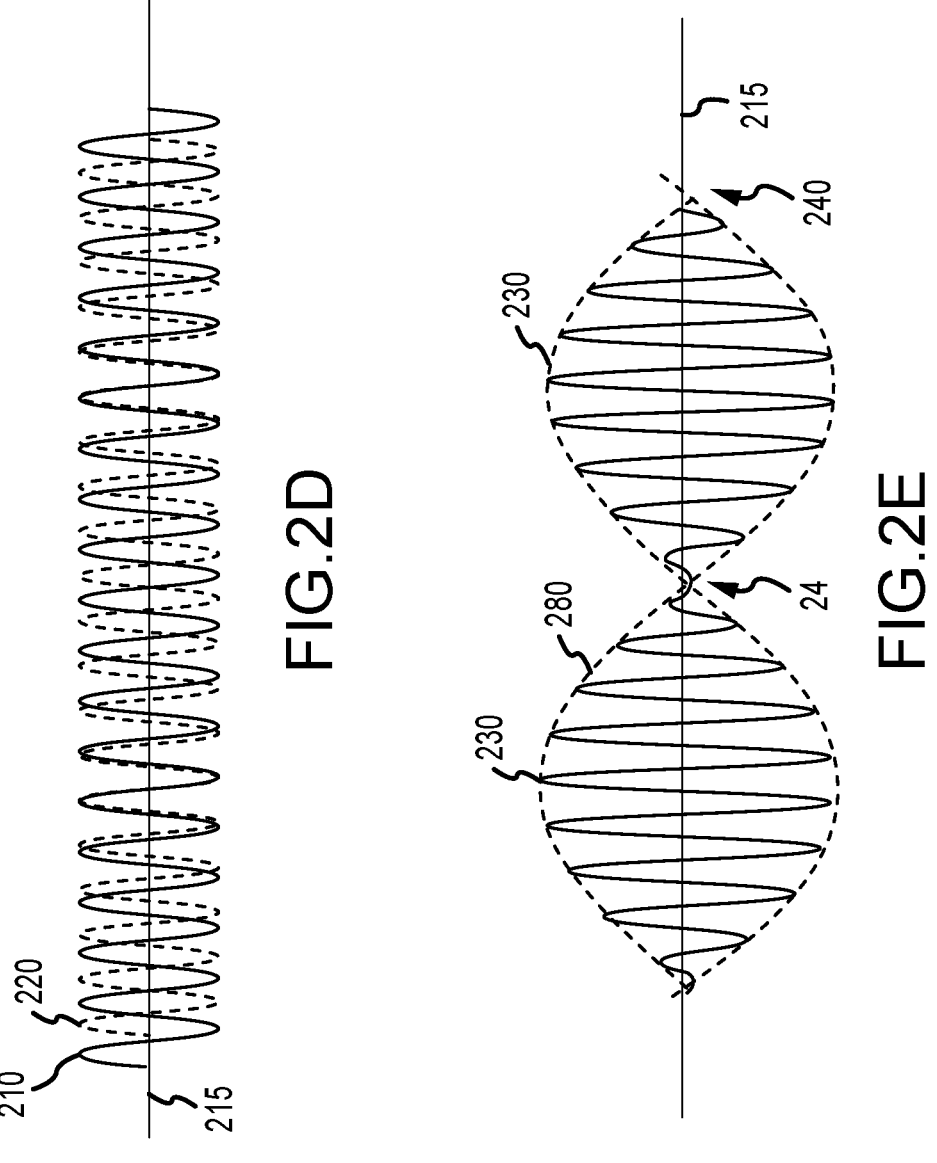
Figure 2F:
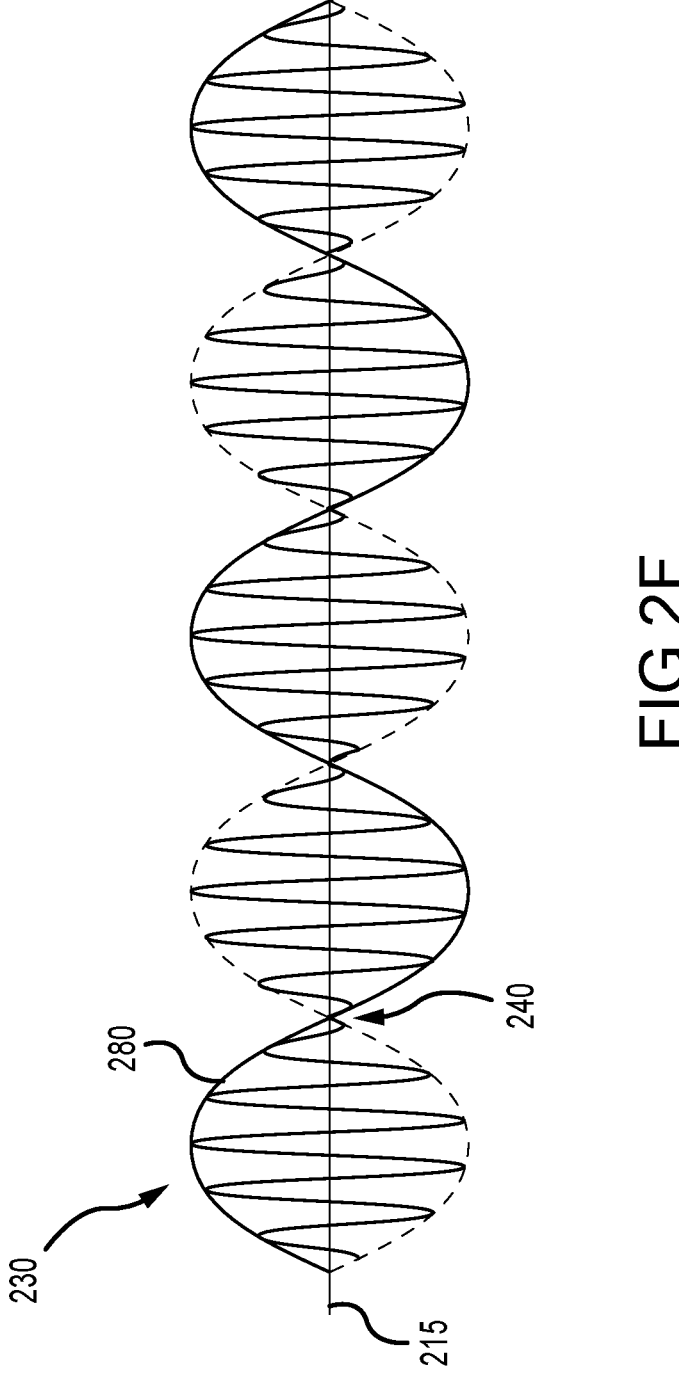

The Figures depict embodiments of the present invention for purposes of illustration only. Like numbers refer to like elements throughout. In the figures, the sizes of certain lines, layers, components, elements or features may be exaggerated for clarity. One skilled in the art will readily recognize from the following discussion that alternative embodiments of the structures and methods illustrated herein may be employed without departing from the principles of the invention described herein.

DESCRIPTION OF THE INVENTION

A system and associated methodology for generating a tunable, modulated high-frequency light beam from a single source of coherent light is hereafter disclosed and described by way of example. In one embodiment of the present invention a method for light modulation includes generating single ultra-short pulse of coherent light. The ultra-short pulse of coherent light, having an optical spectrum, is derived from a single light source. The methodology continues by spreading the optical spectrum of the ultra-short pulse of coherent light forming a spectrally spread optical pulse which is thereafter split into two or more spectrally spread optical pulses. At least one of the two or more spectrally spread optical pulses is delayed, such that, upon recombining the two or more spectrally spread optical pulses, a tunable, modulated spectrally spread optical pulse is formed.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein, the term "dispersion" is meant to mean the state of getting dispersed or spread. In optics and in wave propagation in general, dispersion is the phenomenon in which the phase velocity of a wave depends on its frequency; sometimes the term chromatic dispersion is used for specificity to optics.

As used herein, the term "coherent light" it is meant the waves of light are identical and in phase, which produces a beam of coherent light. A beam of laser light will not spread and diffuse.

As used herein, the term "laser" it is meant to mean a device that emits light through a process of optical amplification based on the stimulated emission of electromagnetic radiation. The word "laser" is an acronym for "light amplification by stimulated emission of radiation". A laser differs from other sources of light in that it emits light which is coherent.

As used herein, the term "ultra-short pulse" it is meant to mean an ultrafast event or an electromagnetic pulse whose time duration is of the order of a picosecond ($10^{-12}$ second) or less. Such pulses have a broadband optical spectrum and can be created by mode-locked oscillators. Mode-locked lasers are specialized optical lasers that emit a series of highly regular, ultrashort pulses of light. Mode-locked lasers use a special technique to generate these pulses, called mode-locking, which involves synchronizing the oscillations of the laser cavity elements to produce short bursts of light. This technique is used in a variety of applications, including spectroscopy, communication, and medical imaging. Mode-locked lasers are also capable of producing extremely fast pulses, with a duration as short as a few femtoseconds. Because of their precise control, mode-locked lasers are often used as the basis for frequency combs, which are used in many precision measurement applications. Amplification of ultrashort pulses almost always requires the technique of chirped pulse amplification, to avoid damage to the gain medium of the amplifier.

As used herein, the term "optical spreading" or "dispersion" it is meant to mean as an individual pulse propagates, it spreads out, due to the dispersive properties, normally found in a fiber. Laser light dispersion is the process of splitting laser light into its component wavelengths, or colors. This occurs when the laser light passes through a prism, diffraction grating, or other dispersive element that causes the light to separate into its different components. The process of laser light dispersion can be used to create a range of colors, including the full visible spectrum of colors. Laser light dispersion also has a variety of applications in fields such as manufacturing, medicine, and scientific research.

As used herein, the term "delaying" it is meant to mean an optical setup which is used to introduce a time delay for a light beam. Most optical delay lines work on the basis that the pulses are sent through an optical arrangement with a variable path length or through a medium in which the speed of transmission varies. For example, one way to adjust the path length of a short pulse laser is by using an acousto-optic modulator (AOM). An AOM works by using sound waves to change the refractive index of a material, which then modifies the speed that light travels through it. By adding an AOM in the path of the laser beam, the pulse length can be adjusted by controlling the acoustic frequency of the sound waves. Additionally, different dispersive elements such as gratings or prisms can be used to control the pulse length by selectively blocking or reflecting different wavelengths of light.

As used herein, the term "modulating" it is meant to mean an alteration of the amplitude or frequency of an electromagnetic wave in accordance with the variations of a second signal with which it interferes.

As used herein, the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

Included in the description are flowcharts depicting examples of the methodology which may be used to create a tunable high frequency modulated light beam. In the following description, it will be understood that one or more blocks of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware, firmware, and hardware-based computer systems that perform the specified functions or steps, or combinations of special purpose hardware and computer instructions.

Figure 3:
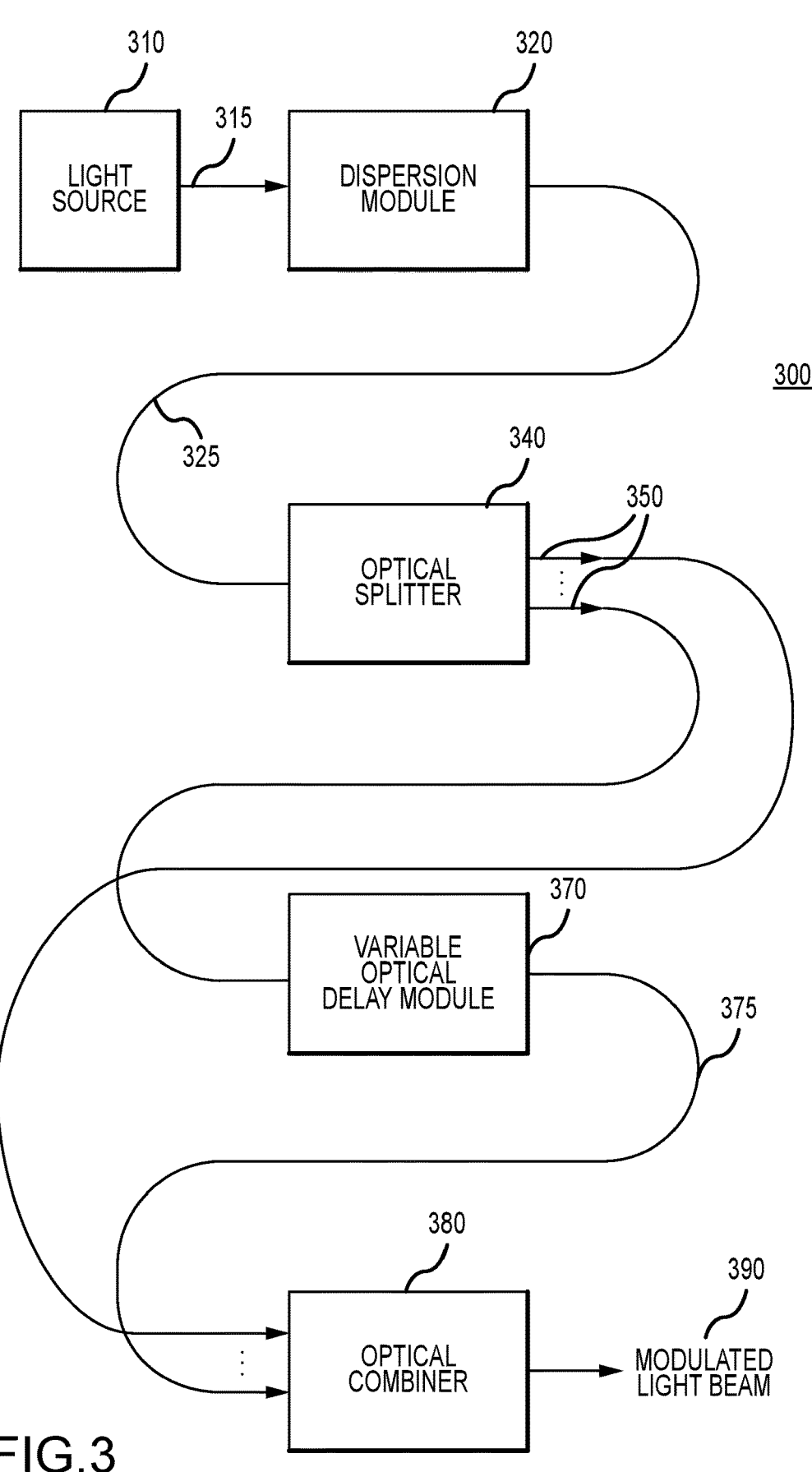
FIG. 3 is a high-level diagram of a system for producing a tunable, modulated high-frequency light beam according to one embodiment of the present invention.

FIG. 3 presents a high-level illustration of one embodiment for a system 300 for producing a tunable high frequency modulated light beam. A modulated and tunable light beam 390 is derived from a single light source 310. An ultra-short pulse of light, 315, such as one produced by a mod-locked laser or similar light source, is directed to a dispersion module 320 wherein the pulse is temporally and spectral spread or dispersed. Dispersion is the phenomenon in which the phase velocity of a wave depends on its frequency. The most familiar example of dispersion is a rainbow, in which dispersion causes the spatial separation of a white light into components of different wavelengths (different colors).

Waveguides are dispersive due to their geometry as are certain optical fibers. In one embodiment a compensating fiber is coupled to the light source as the dispersion module, configured to spread (disperse) a short optical pulse into its constituent frequencies.

The dispersion module 320 is thereafter communicatively coupled, and directs the spread optical pulse 325, to an optical splitter 340. An optical splitter, or beam splitter, is an integrated waveguide optical power distribution device that can split an incident light beam into two or more light beams. The splitter 340 is, in one version of the present invention, configured to split the spread optical pulse into two optical pulses 350. These two pulses are spatially identical with each possessing, in this example, half of the original amplitude of the original spread optical pulse.

There are multiple ways to split laser light into two or more pulses. These include Diffraction Gratings: Diffraction gratings are optical components used to separate light into its component wavelengths. A diffraction grating is an optical element featuring a periodic structure that splits and diffracts light into several beams travelling in different directions.

Beam Splitters: Beam splitters are optical components used to split a single beam of light into two or more separate beams. Beam splitters are used to divide a single beam of light into two beams of equal intensity, or to divide a single beam of light into multiple beams of different intensities.

Polarizing Beam Splitters: Polarizing beam splitters are optical components used to split a beam of light into two polarized beams. A polarizing beam splitter uses a polarizing filter to separate a beam of unpolarized light into two polarized beams.

Prisms: A prism is an optical component used to split a beam of light into a spectrum of its component wavelengths. A prism is a transparent optical element with flat, polished surfaces that refracts light.

Wavelength Selective Switches: Wavelength selective switches are optical components used to select and split a single wavelength of light from a beam of mixed wavelengths.

These and other methodologies to split a laser light pulse are contemplated for use with the present invention.

In another version of the present invention the optical splitter is configured to split the spread optical pulse into two or more daughter spread optical pulses. Each of these daughter or split spread optical pulses are directed to an optical combiner 380, albeit each along independent paths. A variety of beam splitters can be effectively employed in the present invention. For example, two triangular prisms combined at their base will split a single beam into two equal beams. By nesting this these components, a plurality of beams can be created. Half silvered mirrors represent another design for beam splitting as is a dichroic mirrored prism assembly which uses dichroic optical coatings to divide an incoming light beam into several spectrally distinct output beams. As a beam splitter divides a single light beam into two or more optical beams, they can also combine two or more beams into a single light beam. Interposed between the optical splitter and the optical combiner is, in one embodiment of the present invention, a variable optical delay 370.

The variable optical delay 370 modulates, in one embodiment, the optical length of the path of one or more of the split spread optical pulses. As the paths are different, each spread optical pulse 350, 375 arrives at the optical combiner 380 offset, or out of phase, with each other. The waves 350, 375 interfere with each other as they are combined forming a new, modulated waveform or light beam 370. The interference of the combined pulses form interference beats which can be modulated at will by varying the optical delay.

This process is also known as Heterodyning. Heterodyning is a nonlinear optical process in which two laser beams of slightly different frequency are mixed. The resulting output beam contains the sum and difference frequency components of the two input beams. This can be used to detect and measure the small frequency difference between the two beams. It can be used in optical spectroscopy and can be used to measure the resonance frequency of a laser cavity and to measure laser linewidth. It can also be used to measure the frequency difference between two lasers, which can then be used to stabilize a laser to a reference frequency.

The modulated light beam 390 is itself a unique beam having distinct frequency and amplitude characteristics. The present invention enables a plurality of paths to be created (split) from the original spread optical pulse and then recombined at will. By uniquely delaying each pulse and thereafter uniquely combining two or more delayed pulses, the present invention creates a tunable modulated light beam.

In an alternative embodiment, the optical delay module 370 is tunable. In this embodiment one of the two split spread optical pulses is directed to the variable optical delay module while the other is channeled to the optical combiner directly. The variable optical delay module can freely alter the delay of one of the two spread optical pulses and deliver a tuned delayed spread optical pulse to the optical combiner module. The original spread optical pulse combined with the variably delayed spread optical pulse forms a tunable modulated light beam.

Figure 4:
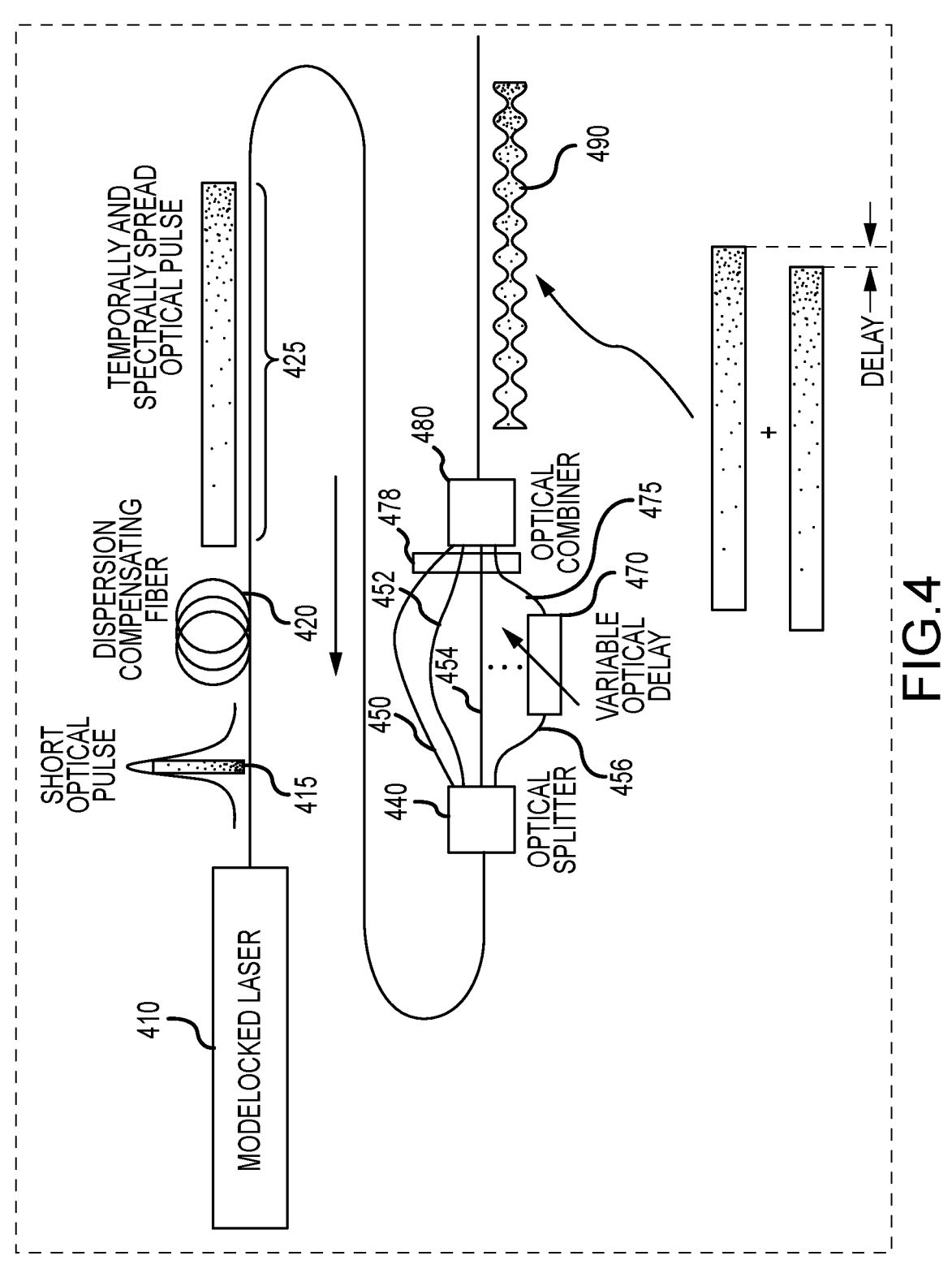
FIG. 4 shows an alternative embodiment of a system configuration for producing the tunable, modulated high-frequency light beam of the present invention.

FIG. 4 shows another embodiment of a system for generating a tunable high frequency modulated light beam according to the present invention. In this version of the present invention a mode-locked laser 410 produces a single ultra-short pulse 415 of coherent light. The short optical pulse 415 is directed to a dispersion compensating fiber 420 resulting in a temporally and spectrally spread optical pulse 425.

The temporally and spectrally spread optical pulse 425 is feed into a one-to-many optical splitter 440 resulting in two or more temporally and spectrally spread optical pulses 450, 452, 454, 456 directed to an optical combiner 480. Each of the two or more split temporally and spectrally spread optical pulses 450, 452, 454, 456 travels to the optical combiner along an independent and unique path. At least one split temporally and spectrally spread optical pulse 456 is manipulated by a variable optical delay 470. The pulse 475 exiting the variable optical delay 470 and each of other split temporally and spectrally spread optical pulses 450, 452, 454 pass through a switch 478 before reaching the optical combiner 480.

The switch 478 and/or variable optical delay 470 enable the present invention to modulate or tune the combined optical beam 490 by varying the delay of the split spread optical pulse or selecting one or more of the split optical pulses having distinct yet different path.

The tunning of the combined spread optical pulses can be manipulated to form various radio frequencies or a wave form set to a harmonic frequency to cause resonance or scattering (depending on the application). Indeed, in another application, the tunable modulated light beam frequency can be set to excite one or more Raman modes of amplification.

FIG. 5 is a flowchart of one methodology, according to the present invention, for generation of a tunable high frequency modulated light beam. The process beings 505 by generating 510 an ultra-short pulse of coherent light. This pulse includes an optical spectrum and is, in one embodiment, produced by a mode-locked laser. In other embodiments the gain medium of the coherent light source can be liquid, gas, semiconductor, solid state, or fiber.

Lasers are typically identified by their gain medium and are often classified by the radiating species that give rise to stimulated emission. These radiating species can include atoms and molecules in a dilute gas, organic molecules dissolved at relatively low concentration in liquid solutions, semiconductor materials, and dielectrics such as crystalline solids or glasses that are doped with a high concentration of ions.

The concentration of the radiating species plays a significant role in the formation of the medium's energy levels. In turn, these energy levels will dictate the optical pumping transition, configuration for population inversion, laser emission wavelength, and gain bandwidth.

Once generated, the process spreads 520 the optical (and/or temporal) spectrum of the light pulse forming a spectrally spread optical pulse. The spectrally spread optical pulse is split 530 into two or more spectrally spread optical pulses by an optical splitter. Each spectrally spread optical pulse travels a unique path to an optical combiner. At least one of the spectrally spread optical pulses is delayed 540 to arrive at the optical combiner out of phase with the other spectrally spread optical pulse(s). The process concludes 595 by combining 550 (also called heterodyning) the delayed spectrally spread optical pulse with the original spectrally spread optical pulse to form a modulated spectrally spread optical pulse.

By varying the delay of one or more of the split spectrally-spread optical pulses the modulated spectrally spread optical pulse can be tuned to a particular application.

Upon reading this disclosure, those of skill in the art will appreciate still additional alternative structural and functional designs for a system and a process for generating a tunable high-frequency light beam through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope of the invention.

In a preferred embodiment, one or more portions of present invention can be implemented in software. Software programming code which embodies the present invention is typically accessed by a microprocessor from long-term, persistent storage media of some type, such as a flash drive or hard drive. The software programming code may be embodied on any of a variety of known media for use with a data processing system, such as a diskette, hard drive, CD-ROM, or the like. The code may be distributed on such media or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

An exemplary system for implementing the invention includes a general-purpose computing device such as the form of a conventional personal computer, a personal communication device or the like, including a processing unit, a system memory, and a system bus that couples various system components, including the system memory to the processing unit. The system bus may be any of several types of bus structures including a memory bus or memory controller, a peripheral bus, and a local bus using any of a variety of bus architectures. The system memory generally includes read-only memory (ROM) and random-access memory (RAM). A basic input/output system (BIOS), containing the basic routines that help to transfer information between elements within the personal computer, such as during start-up, is stored in ROM. The personal computer may further include a hard disk drive for reading from and writing to a hard disk, a magnetic disk drive for reading from or writing to a removable magnetic disk. The hard disk drive and magnetic disk drive are connected to the system bus by a hard disk drive interface and a magnetic disk drive interface, respectively. The drives and their associated computer-readable media provide non-volatile storage of computer readable instructions, data structures, program modules and other data for the personal computer. Although the exemplary environment described herein employs a hard disk and a removable magnetic disk, it should be appreciated by those skilled in the art that other types of computer readable media which can store data that is accessible by a computer may also be used in the exemplary operating environment.

Embodiments of the present invention as have been herein described may be implemented with reference to various wireless networks and their associated communication devices. Networks can also include mainframe computers or servers, such as a gateway computer or application server (which may access a data repository). A gateway computer serves as a point of entry into each network. The gateway may be coupled to another network by means of a communications link. The gateway may also be directly coupled to one or more devices using a communications link. Further, the gateway may be indirectly coupled to one or more devices. The gateway computer may also be coupled to a storage device such as data repository.

While there have been described above the principles of the present invention in conjunction with a tunable high frequency modulated light beam, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A method for light modulation, comprising:
   generating an ultra-short pulse of coherent light, using a mode-locked laser, wherein the ultra-short pulse of coherent light includes an optical spectrum;

spreading the optical spectrum of the ultra-short pulse of coherent light forming a spectrally spread optical pulse;

splitting the spectrally spread optical pulse into two or more spectrally spread optical pulses;

dynamically delaying at least one of the two or more spectrally spread optical pulses using a variable optical delay module comprising an electronically controllable delay line forming a delay, wherein the delay is varied in real time to tune a modulation beat frequency of a recombined optical pulse within a megahertz to gigahertz range; and recombining the two or more spectrally spread optical pulses forming a modulated spectrally spread optical pulse having a tunable beat frequency envelope wherein a dispersion module is configured to control phase alignment among the recombined optical pulses to produce a predetermined modulation envelope.

2. The method for light modulation of claim 1, wherein spreading the optical spectrum of the ultra-short pulse of coherent light is accomplished within a dispersion compensating fiber.

3. The method for light modulation of claim 1, directing each of the two or more spectrally spread optical pulses to follow a unique optical path wherein each optical path has a path length.

4. The method for light modulation of claim 3, modulating the path length of at least one unique optical path thereby delaying at least one of the two or more spectrally spread optical pulses.

5. The method for light modulation of claim 1, wherein modulating forms a modulated Radio Frequency.

6. The method for light modulation of claim 1, wherein the modulated spectrally spread optical pulse includes a tunable beat frequency.

7. The method for light modulation of claim 6, wherein the tunable beat frequency matches a molecular resonance frequency.

8. The method for light modulation of claim 6, wherein the tunable beat frequency matches a select resonance frequency.

9. The method for light modulation of claim 6, wherein the tunable beat frequency excites one or more Raman modes of amplification.

10. The method for light modulation of claim 1, wherein a single source generates the ultra-short pulse of coherent light.

11. The method for light modulation of claim 1, wherein delaying includes forming at least one delayed spectrally spread optical pulse and a non-delayed spectrally spread optical pulse.

12. The method for light modulation of claim 11, wherein recombining includes recombining the at least one delayed spectrally spread optical pulse and the non-delayed spectrally spread optical pulse forming the modulated spectrally spread optical pulse wherein the modulated spectrally spread optical pulse includes beat frequency.

13. The method for light modulation of claim 1, wherein delaying includes modulating a delay of the at least one of the two or more spectrally spread optical pulses thereby tuning the modulated spectrally spread optical pulse.

14. A system for light modulation, the system comprising:

a mode-locked laser light source configured to generate an ultra-short pulse of coherent light wherein the ultra-short pulse of coherent light includes an optical spectrum;

a dispersion module optically coupled to the light source and configured to spread the optical spectrum of the ultra-short pulse of coherent light forming a spectrally spread optical pulse;

an optical splitter configured to split the spectrally spread optical pulse into two or more spectrally spread optical pulses;

a variable optical delay module comprising a controllable delay line configured to selectively delay at least one of the two or more spectrally spread optical pulses relative to another a controller operatively coupled to the variable optical delay module to dynamically vary the delay in real time, thereby tuning a modulation beat frequency of the spectrally spread optical pulses within a megahertz to gigahertz range; and an optical combiner configured to recombine the two or more spectrally spread optical pulses forming a modulated optical beam exhibiting simultaneous temporal and spectral modulation and a tunable beat frequency envelope, wherein the dispersion module is further configured to adjust phase alignment among the recombined optical pulses to produce a predetermined modulation envelope.

15. The system for light modulation according to claim 14, wherein the light source is a single source.

16. The system for light modulation according to claim 14, wherein the dispersion module is a dispersion compensating fiber.

17. The system for light modulation according to claim 14, wherein the variable optical delay includes two or more optical paths and wherein each path has a distinct path length.

18. The system for light modulation according to claim 14, wherein the modulated spectrally spread optical pulse is a tunable beat frequency.

19. The system for light modulation according to claim 18, wherein the tunable beat frequency is a modulated Radio Frequency.

20. The system for light modulation according to claim 18, wherein the tunable beat frequency is a molecular resonance frequency.

21. The system for light modulation according to claim 18, wherein the tunable beat frequency is a select resonance frequency.

22. The system for light modulation according to claim 18, wherein the tunable beat frequency is configured to excite one or more Raman modes of amplification.

\* \* \* \* \*